(12) United States Patent
Kim et al.

(10) Patent No.: US 12,554,261 B2
(45) Date of Patent: Feb. 17, 2026

(54) SERVICE ROBOT AND METHOD FOR PROVIDING DELIVERY SERVICE THEREOF

(71) Applicants: HYUNDAI MOTOR COMPANY, Seoul (KR); KIA CORPORATION, Seoul (KR)

(72) Inventors: Ga Hee Kim, Seoul (KR); Yun Sub Kim, Suwon-si (KR); Hwan Hee Lee, Gunpo-si (KR); Seung Yong Lee, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 152 days.

(21) Appl. No.: 18/509,992

(22) Filed: Nov. 15, 2023

(65) Prior Publication Data
US 2024/0353841 A1    Oct. 24, 2024

(30) Foreign Application Priority Data
Apr. 18, 2023   (KR) .......................... 10-2023-0050824

(51) Int. Cl.
*G05D 1/00* (2024.01)
*B25J 9/16* (2006.01)

(52) U.S. Cl.
CPC ............ *G05D 1/0238* (2013.01); *B25J 9/162* (2013.01); *B25J 9/1679* (2013.01); *B25J 9/1697* (2013.01)

(58) Field of Classification Search
CPC .. G05D 1/0238; G05D 1/0212; G05D 1/0225; G05D 1/021; B25J 9/162;
(Continued)

(56) References Cited

U.S. PATENT DOCUMENTS 10,120,384 B2 * 11/2018 Wilkinson ............. G06V 20/58
10,286,558 B1    5/2019 Asada et al.
(Continued)

FOREIGN PATENT DOCUMENTS

JP    2019502977 A    1/2019
JP    2020070160 A    5/2020
(Continued)

*Primary Examiner* — Bao Long T Nguyen
(74) *Attorney, Agent, or Firm* — Lempia Summerfield Katz LLC

(57) ABSTRACT

A service robot and a method for providing a delivery service thereof are provided. The service robot includes a camera, a light detection and ranging (LiDAR) sensor, a driving device including a robotic arm, a processor, and storage. The processor: obtains an image by capturing the outside of the service robot; detects a target vehicle from the image; compares an image of the detected target vehicle with the reference vehicle image; recognizes a type of the target vehicle; recognizes vehicle information; recognizes a distance from the target vehicle; compares the LiDAR data with the vehicle information; recognizes at least one relative direction of the target vehicle; determines a target position and a path; controls the service robot to move to the target position along the path; and controls the service robot to deliver the delivery product to the target vehicle.

20 Claims, 9 Drawing Sheets

(58) Field of Classification Search
CPC ...... B25J 9/1679; B25J 9/1697; B25J 11/008;
B25J 5/00; B25J 9/1666; B25J 13/006;
B25J 13/089; B25J 19/02; G01S 17/93;
G01S 17/88; G01S 17/86; G06V 20/58;
G06V 2201/08; G06V 20/56; B60W
60/00256

See application file for complete search history.

(56) References Cited

U.S. PATENT DOCUMENTS

| | | |
|---|---|---|
| 10,339,514 B2 | 7/2019 | Natarajan et al. |
| 11,416,804 B2 | 8/2022 | Heinla et al. |
| 2013/0054029 A1* | 2/2013 | Huang ................. G05D 1/0038 901/30 |
| 2017/0124547 A1 | 5/2017 | Natarajan et al. |
| 2019/0325414 A1 | 10/2019 | Natarajan et al. |
| 2021/0278851 A1 | 9/2021 | Van Der Merwe et al. |
| 2022/0019213 A1 | 1/2022 | Haghighat Kashani et al. |

FOREIGN PATENT DOCUMENTS

| | | |
|---|---|---|
| KR | 20180044486 A | 5/2018 |
| KR | 20210128579 A | 10/2021 |

\* cited by examiner

SERVICE ROBOT AND METHOD FOR PROVIDING DELIVERY SERVICE THEREOF

CROSS-REFERENCE TO RELATED APPLICATION

This application claims the benefit of and priority to Korean Patent Application No. 10-2023-0050824, filed in the Korean Intellectual Property Office on Apr. 18, 2023, the entire contents of which are incorporated herein by reference.

TECHNICAL FIELD

The present disclosure relates to a service robot and a method for providing a delivery service using the service robot, and more particularly, relates to technologies of allowing the service robot to avoid an obstacle and deliver a product to a customer.

BACKGROUND

The statements in this section merely provide background information related to the present disclosure and may not constitute prior art.

A service robot (e.g., an autonomous mobile robot) refers to a device that: searches its surroundings; detects obstacles; and selects a path using its wheels or legs to reach a destination. Recently, the service robot has been used in various environments. For example, the service robot may be used to move to a specified destination in a specified place (e.g., a specific building or a specific place) and provide various services (e.g., a delivery service). Such a service robot may determine a path for moving to the destination based on information about the specified place and may move to the destination along the determined path to provide a service.

However, when delivering a product to a desired customer, a situation may occur in which the service robot does not accurately deliver the product to a position desired by the customer.

SUMMARY

The present disclosure has been made to solve the above-mentioned problems occurring in the prior art while advantages achieved by the prior art are maintained intact.

An aspect of the present disclosure provides a service robot for delivering a delivery product to a vehicle space desired by a user and a method for providing a delivery service thereof.

Another aspect of the present disclosure provides a service robot for recognizing: a target vehicle to provide a delivery service; a relative direction of the target vehicle; and a door and trunk range of the target vehicle. The service robot may also determine a target position to deliver the delivery product and a movement path and a method for providing a delivery service thereof.

The technical problems to be solved by the present disclosure are not limited to the aforementioned problems. Any other technical problems not mentioned herein should be clearly understood from the following description by those with ordinary skill in the art to which the present disclosure pertains.

According to an aspect of the present disclosure, a service robot may include: a camera; a light detection and ranging (LiDAR) sensor; a driving device including a robotic arm; a processor; and storage including a reference vehicle image and reference vehicle information. According to an embodiment, the processor may: obtain an image by capturing the outside of the service robot using the camera; detect a target vehicle from the image; compare an image of the detected target vehicle with the reference vehicle image; recognize a type of the target vehicle based on the compared result; recognize vehicle information corresponding to the type of the target vehicle in the reference vehicle information; recognize a distance from the target vehicle based on LiDAR data associated with the target vehicle, the LiDAR data being obtained using the LiDAR sensor; compare the LiDAR data with the vehicle information corresponding to the type of the target vehicle; recognize at least one relative direction of the target vehicle based on the compared result; determine a target position for delivering a delivery product to the target vehicle and a path for moving to the target position based on the distance and the at least one relative direction; control the service robot to move to the target position along the path; and control the service robot to deliver the delivery product to the target vehicle using the robotic arm.

According to an embodiment, the reference vehicle information may include at least one of: reference LiDAR data for each type of a vehicle; information associated with doors of the vehicle; or information associated with a trunk of the vehicle.

According an to embodiment, the processor may: determine a degree to which the LiDAR data and the reference LiDAR data are matched with each other; and recognize at least one of the at least one relative direction based on the matched degree.

According to an embodiment, the processor may: receive a user input for specifying a vehicle space to deliver the delivery product among at least one door or a trunk provided in the target vehicle; recognize a position corresponding to the specified vehicle space based on the user input based on the reference information; and determine the target position based on the recognized position.

According to an embodiment, the processor may: extract the image of the detected target vehicle from the image; determine a degree to which the extracted image of the target vehicle and the reference vehicle image are matched with each other, based on the recognized distance; recognize the at least one relative direction of the target vehicle based on the matched degree; and determine a direction of the target vehicle based on a relative direction recognized using the image of the target vehicle and a relative direction recognized using the LiDAR data associated with the target vehicle.

According to an embodiment, the processor may: obtain coordinate information indicating a boundary of the target vehicle from the image; and extract the LiDAR data associated with the target vehicle from LiDAR data for an external object, the LiDAR data being obtained using the LiDAR sensor, based on the coordinate information.

According to an embodiment, the processor may: detect an external object presenting on the path using the LiDAR sensor; recognize the external object as a door or a trunk of the target vehicle, when a position where the external object is detected corresponds to an opening and closing range of the door or the trunk of the target vehicle; recognize the external object as an obstacle, when the position where the external object is detected does not correspond to the opening and closing range of the door or the trunk of the target vehicle; and determine a new path for avoiding the obstacle to reach the target position, when the obstacle is recognized.

According to an embodiment, the processor may determine the target position, based on an operation radius of the robotic arm and a degree of motion of the robotic arm, the degree being predicted when delivering the delivery product.

According to an embodiment, the processor may; recognize identification information of at least one vehicle included in the image; and detect the target vehicle among the at least one vehicle based on the identification information.

According to an embodiment, the service robot may further include a communication device. According to an embodiment, the processor may: receive information associated with the reference vehicle image or the reference vehicle information from an external device through the communication device; and update the reference vehicle image or the reference vehicle information, based on the received information.

According to another aspect of the present disclosure, a method for providing a delivery service in a service robot may include: obtaining an image by capturing the outside of the service robot using a camera included in the service robot; detecting a target vehicle from the image; comparing an image of the detected target vehicle with a reference vehicle image; recognizing a type of the target vehicle based on the compared result; recognizing vehicle information corresponding to the type of the target vehicle in the reference vehicle information; recognizing a distance from the target vehicle based on LiDAR data associated with the target vehicle, the LiDAR data being obtained using a LiDAR sensor included in the service robot; comparing the LiDAR data with the vehicle information corresponding to the type of the target vehicle; recognizing at least one relative direction of the target vehicle based on the compared result; determining a target position for delivering a delivery product to the target vehicle and a path for moving to the target position based on the distance and the at least one relative direction; moving to the target position along the path; and delivering the delivery product to the target vehicle using a robotic arm included in the service robot.

According to an embodiment, the reference vehicle information may include at least one of: reference LiDAR data for each type of a vehicle; information associated with doors of the vehicle; or information associated with a trunk of the vehicle.

According to an embodiment, the recognizing of the at least one relative direction may include: determining a degree to which the LiDAR data and the reference LiDAR data are matched with each other; and recognizing at least one of the at least one relative direction based on the matched degree.

According to an embodiment, the determining of the target position may include: receiving a user input for specifying a vehicle space to deliver the delivery product among at least one door or a trunk provided in the target vehicle; recognizing a position corresponding to the specified vehicle space based on the user input based on the reference vehicle information; and determining the target position based on the recognized position.

According to an embodiment, the method may further include: extracting the image of the detected target vehicle from the image; determining a degree to which the extracted image of the target vehicle and the reference vehicle image are matched with each other, based on the recognized distance; recognizing the at least one relative direction of the target vehicle based on the matched degree; and determining a direction of the target vehicle based on a relative direction recognized using the image of the target vehicle and a relative direction recognized using the LiDAR data associated with the target vehicle.

According to an embodiment, the recognizing of the distance from the target vehicle may include obtaining coordinate information indicating a boundary of the target vehicle from the image and extracting the LiDAR data associated with the target vehicle from LiDAR data for an external object, the LiDAR data being obtained using the LiDAR sensor, based on the coordinate information.

According to an embodiment, the method may further include: detecting an external object presenting on the path using the LiDAR sensor; recognizing the external object as a door or a trunk of the target vehicle, when a position where the external object is detected corresponds to an opening and closing range of the door or the trunk of the target vehicle; recognizing the external object as an obstacle, when the position where the external object is detected does not correspond to the opening and closing range of the door or the trunk of the target vehicle; and determining a new path for avoiding the obstacle to reach the target position, when the obstacle is recognized.

According to an embodiment, the determining of the target position may include determining the target position, based on an operation radius of the robotic arm and a degree of motion of the robotic arm, the degree being predicted when delivering the delivery product.

According to an embodiment, the detecting of the target vehicle may include recognizing identification information of at least one vehicle included in the image and detecting the target vehicle among the at least one vehicle based on the identification information.

According to an embodiment, the method may further include: receiving information associated with the reference vehicle image or the reference vehicle information from an external device; and updating the reference vehicle image or the reference vehicle information, based on the received information.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
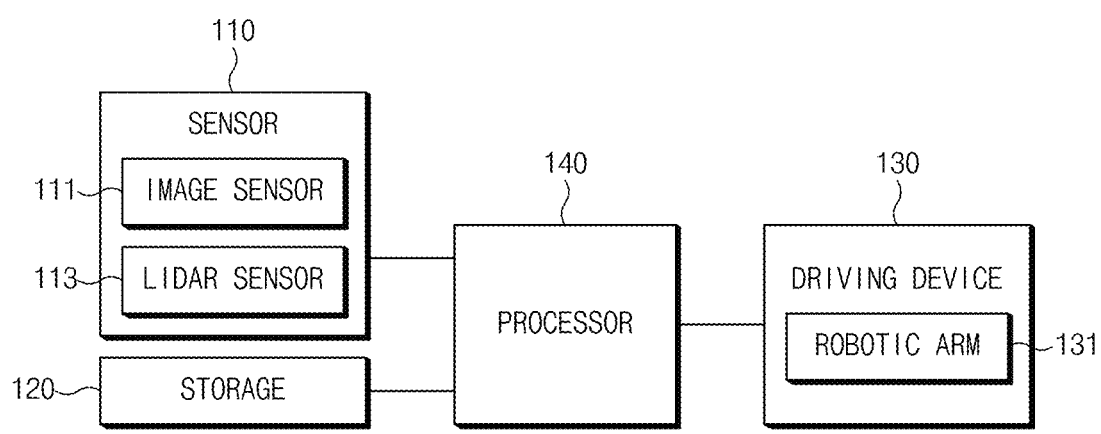
FIG. 1 is a block diagram illustrating a configuration of a service robot according to an embodiment of the present disclosure.

Hereinafter, some embodiments of the present disclosure are described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions is ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those with ordinary skill in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application.

When a component, device, element, or the like, of the present disclosure, is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-8.

FIG. 1 is a block diagram illustrating a configuration of a service robot according to an embodiment of the present disclosure.

According to an embodiment, a service robot 100 may include at least one sensor 110, storage 120, a driving device 130, and a processor 140.

According to an embodiment, the at least one sensor 110 may include an image sensor 111 (e.g., a camera) and a light detection and ranging sensor 113. For example, the image sensor 111 may generate an image by capturing the outside of the service robot 100. For example, the image sensor 111 may obtain an image including an external object (e.g., an external vehicle). For example, the LiDAR sensor 113 may obtain information about an external object of the service robot 100 (e.g., at least one of a building, a structure, a person, a vehicle, an external device (e.g., another service robot 100), or an external object, or any combination thereof). The LiDAR sensor 113 may obtain three-dimensional (3D) LiDAR data associated with an external object (e.g., a vehicle).

According to various embodiments, the sensors included in the at least one sensor 110 are not limited to the image sensor and the LiDAR sensor, which may include various other sensors (e.g., an ultrasonic sensor, a radar sensor, an infrared (IR) sensor, an acceleration sensor, a gyro sensor, a position sensor (e.g., a global positioning system (GPS), and/or a proximity sensor).

According to an embodiment, the storage 120 may store a reference vehicle image and reference vehicle information. For example, the reference vehicle image may include a plurality of images obtained by capturing a vehicle at various angles and/or various distances for each type of the vehicle. For example, the reference vehicle image may include images for each angle for all orientations of the vehicle for each type of the vehicle. For example, the reference vehicle information may include at least one of reference LiDAR data (e.g., 410 of FIG. 4) for each type of the vehicle, information associated with doors of the vehicle, or information associated with a trunk of the vehicle. For example, the reference vehicle information may include information of a specified format (e.g., a pure component data (PCD) extension file). For example, the storage 120 (or a database) of the service robot 100 may store reference vehicle information including vehicle information for each type of the vehicle. For example, the reference vehicle information may include reference LiDAR data for each type of the vehicle, information associated with doors of the vehicle, or information associated with a trunk of the vehicle. For example, the reference LiDAR data may include 3D LiDAR data for the entire vehicle. The information associated with the doors of the vehicle may include information about a length, a width, and a depth of each of the doors of the vehicle and 3D LiDAR data for each of the doors of the vehicle. The information associated with the trunk of the vehicle may include information about information of a length, a width, and a depth of the trunk of the vehicle and 3D LiDAR data for the trunk of the vehicle.

Table 1 below indicates an example of the reference vehicle information, but items included in the reference vehicle information and a form of the information are not limited thereto.

TABLE 1

| Vehicle type | Reference LiDAR data | Doors | Trunk |
|---|---|---|---|
| A (sedan) | A.pcd | [A_fl.pcd, A_fr.pcd, A_rl.pcd, A_rr.pcd] | [Width: 2, length: 10, Height: 1], A_trunk.pcd |
| B (RV) | B.pcd | [B_fl.pcd, B_fr.pcd, B_rl.pcd, B_rr.pcd] | [Width: 2, length: 10, Height: 1.5], B_trunk.pcd |
| ... | ... | ... | ... |

For example, the reference LiDAR data may include 3D LIDAR data (e.g., a pcd extension file) for the entire vehicle (or all orientations) for each type of the vehicle. For example, the information associated with the doors may include information about a size, a radius, and/or an (opening and closing) range of a front left door, a front right door, a rear left door, or a rear right door for each type of the vehicle and/or 3D LiDAR data (e.g., a pcd extension file). For example, the information associated with the trunk may include information about a size, a radius, and an (opening and closing) range of the trunk for each type of the vehicle and/or 3D LiDAR data (e.g., a pcd extension file).

For example, for sedan vehicle A, file A.pcd may include 3D reference LiDAR data for all of vehicle A. File A_fl.pcd may include data associated with the front left door of vehicle A. File A_fr.pcd may include data associated with the front right door of vehicle A. File A_rl.pcd may include data associated with the rear left door. File A_rr.pcd may include data associated with the rear right door. For example, the information associated with the trunk may include information about a width, a length, or a height of the trunk of the vehicle. For example, file A_trunk.pcd may include data associated with a trunk of vehicle A.

According to an embodiment, the storage 120 may store the information obtained by means of the at least one the sensor 110. For example, the storage 120 may store the image captured using the image sensor 111. The storage 120 may store the information obtained using the LiDAR sensor 113. According to an embodiment, the storage 120 may store data associated with performing an operation, a function, and/or a service of the service robot 100.

According to an embodiment, the storage 120 may store instructions executed by the processor 140. The storage 120 may include at least one of storage media such as a flash memory, a hard disk, a solid-state disk (SSD), a secure digital (SD) card, an embedded multimedia card (eMMC), universal flash storage (UFS), a removable disk, and/or web storage or storage media such as a random-access memory (RAM), a static RAM (SRAM), a read-only memory (ROM), a programmable ROM (PROM), an electrically erasable and programmable ROM (EEPROM), and/or an erasable and programmable ROM (EPROM).

According to an embodiment, the driving device 130 may include a robotic arm 131. The robotic arm 131 may be implemented to hold, grip, and/or adsorb (e.g., perform vacuum adsorption of) an object (e.g., a delivery product). The robotic arm 131 may be composed of a multi-axis robotic arm 131 to enhance the degree of freedom for delivering the object. For example, the driving device 130 may control a holding, gripping, and/or adsorbing operation of the robotic arm 131 and may control movement and rotation of a multi-axis structure of the robotic arm 131. According to an embodiment, the driving device 130 may further include a mobility device (not shown) (e.g., a wheel or a leg). The driving device 130 may control the mobility device such that the service robot 100 perform autonomous movement. For example, the driving device 130 may include an actuator for driving the robotic arm 131 and/or the mobility device. According to an embodiment, the driving device 130 may control an operation of the robotic arm 131 and/or an operation of the mobility device, under control of the processor 140.

According to an embodiment, the processor 140 may detect a target vehicle from the image. For example, the processor 140 may recognize identification information (e.g., a license plate) of at least one vehicle included in the image. The processor 140 may detect a target vehicle to provide a service (e.g., product delivery) based on the recognized identification information. According to an embodiment, the processor 140 may obtain coordinate information (e.g., boundary box (Bbox) information) indicating a boundary of the target vehicle from the image. According to an embodiment, the processor 140 may extract an image of the target vehicle from the image.

According to an embodiment, the processor 140 may compare the image of the detected target vehicle with the reference vehicle image. For example, the processor 140 may determine a matching rate between the image of the target vehicle and a plurality of reference vehicle images. According to an embodiment, the processor 140 may determine a matching rate (hereinafter referred to as an "image matching rate") between the image of the target vehicle for each angle and the reference vehicle image. According to an embodiment, the processor 140 may recognize an angle with the highest image matching rate as a relative direction (hereinafter referred to as a "first measurement direction") of the target vehicle for the service robot 100. According to an embodiment, the processor 140 may fail to perform the operation of recognizing the first measurement direction based on the image matching rate.

According to an embodiment, the processor 140 may recognize a type of the target vehicle based on the compared result. The processor 140 may recognize the type of the target vehicle based on a reference vehicle image corresponding to the image of the target vehicle. For example, because the reference vehicle image includes an image for each of a plurality of vehicle types, the processor 140 may recognize a vehicle type of a reference vehicle image with the highest matching rate with the image of the target vehicle as the type of the target vehicle.

According to an embodiment, the processor 140 may recognize vehicle information corresponding to the type of the target vehicle in the reference vehicle information. For example, the processor 140 may recognize reference LiDAR data corresponding to the recognized type of the target vehicle, data associated with the doors, and/or data associated with the trunk.

According to an embodiment, the processor 140 may recognize a distance from the target vehicle based on LiDAR data associated with the target vehicle, which is obtained using the LiDAR sensor 113. For example, the processor 140 may recognize a distance from an external object (e.g., the target vehicle) based on data sensed using the LiDAR sensor 113. According to an embodiment, the processor 140 may extract LiDAR data associated with the target vehicle from the LiDAR data for the external object, which is obtained using the LiDAR sensor 113, based on coordinate information indicating a boundary of the target vehicle, which is obtained from the image.

According to an embodiment, the processor 140 may compare the LiDAR data with reference vehicle information corresponding to the type of the vehicle. For example, the processor 140 may determine a matching rate for each angle between the LiDAR data associated with the target vehicle and the reference vehicle data.

According to an embodiment, the processor 140 may recognize a relative direction of the target vehicle based on the compared result of the LiDAR data. For example, the processor 140 may recognize an angle with the highest LiDAR data matching rate as a relative direction (hereinafter referred to as a "second measurement direction") of the target vehicle for the service robot 100.

For example, the processor 140 may add the image matching rate for each angle and the LiDAR data matching rate for each angle and may determine an angle with the highest value as the relative direction of the target vehicle. For example, the processor 140 may determine an angle with the highest weighted average value of the image matching rate for each angle and the LiDAR data matching rate for each angle as a direction of the target vehicle. The processor 140 may determine an average or a weighted average of the first measurement direction and the second measurement direction as a direction of the target vehicle. For example, a weight for the image or the LiDAR data may be set by a user. According to an embodiment, the processor 140 may omit the operation of recognizing the first measurement direction according to the image matching rate and may determine the second measurement direction according to the LiDAR data matching rate as a direction (e.g., a relative direction) of the target vehicle.

According to an embodiment, the processor 140 may determine a target position for delivering a delivery product to the target vehicle and a path for moving to the target position, based on the distance from the target vehicle and the relative direction of the target vehicle. According to an embodiment, the processor 140 may receive a user input for specifying a space of the target vehicle to deliver the delivery product. For example, the user may specify the space of the target vehicle to deliver the delivery product to one space among the inside of the front left door of the target vehicle, the inside of the front right door of the target vehicle, the inside of the rear left door of the target vehicle, the inside of the rear right door of the target vehicle, or the inside of the trunk. According to an embodiment, the processor 140 may determine the target position with regard to the space of the target vehicle, which is specified by the user. For example, when the user specifies the space of the target vehicle to deliver the delivery product to the trunk of the target vehicle, the processor 140 may determine a target position corresponding to the trunk of the target vehicle and a path for moving to the target position, based on the relative direction of the target vehicle. According to an embodiment, the processor 140 may determine a position, at which a moving radius of the robotic arm 131 does not meet with the target vehicle (e.g., a body of a first target vehicle or a door range or a trunk range of the first target vehicle) and the robotic arm 131 is able to move to be shortest when delivering the delivery product to the space specified by the user, as the target position.

According to an embodiment, the processor 140 may detect an external object which is present on the path using the LiDAR sensor 113 during the movement of the service robot 100. The processor 140 may determine whether the position where the external object is detected is within the door range or the trunk range of the target vehicle based on the reference vehicle information. For example, when the position where the external object is detected corresponds to an opening and closing range of the door or the trunk of the target vehicle, the processor 140 may recognize the external object as the door or the trunk of the target vehicle. For example, when the position where the external object is detected does not correspond to the opening and closing range of the door or the trunk of the target vehicle, the processor 140 may recognize the external object as an obstacle. For example, when an object is detected within the door range or the trunk range of the target vehicle, the processor 140 may determine that the detected object is a part of the target vehicle (e.g., the door or the trunk of the target vehicle). For example, the processor 140 may determine that the door of the target vehicle is opened or the trunk of the target vehicle is opened. When it is determined that the detected object is a part (e.g., the door or the trunk) of the target vehicle, the processor 140 may maintain an existing movement path, may move again after waiting for a specified time, or may output a notification that the detected object interferes with the path. For example, when an object out of the door range or the trunk range of the target vehicle is detected, the processor 140 may recognize the detected object as an obstacle regardless of the target vehicle. When the obstacle is recognized on the movement path, the processor 140 may determine a new path for avoiding the obstacle to reach the target position. For example, the processor 140 may correct the existing movement path to another path. For example, when moving the detected obstacle using the robotic arm 131, the processor 140 may clear the obstacle using the robotic arm 131 and may maintain the existing movement path.

According to an embodiment, the processor 140 may allow the service robot 100 to move to the target position along the determined path. According to an embodiment, the processor 140 may deliver the delivery product to the target vehicle using the robotic arm 131. For example, the processor 140 may deliver the delivery product to a space (e.g., the inside of a specific door or the inside of the trunk) of the target vehicle, which is specified by the user, using the robotic arm 131.

According to an embodiment, the processor 140 may receive information associated with the reference vehicle image or the reference vehicle information from the external device. The processor 140 may update the reference vehicle image or the reference vehicle information stored in the storage 120, based on the received information.

Figure 8:
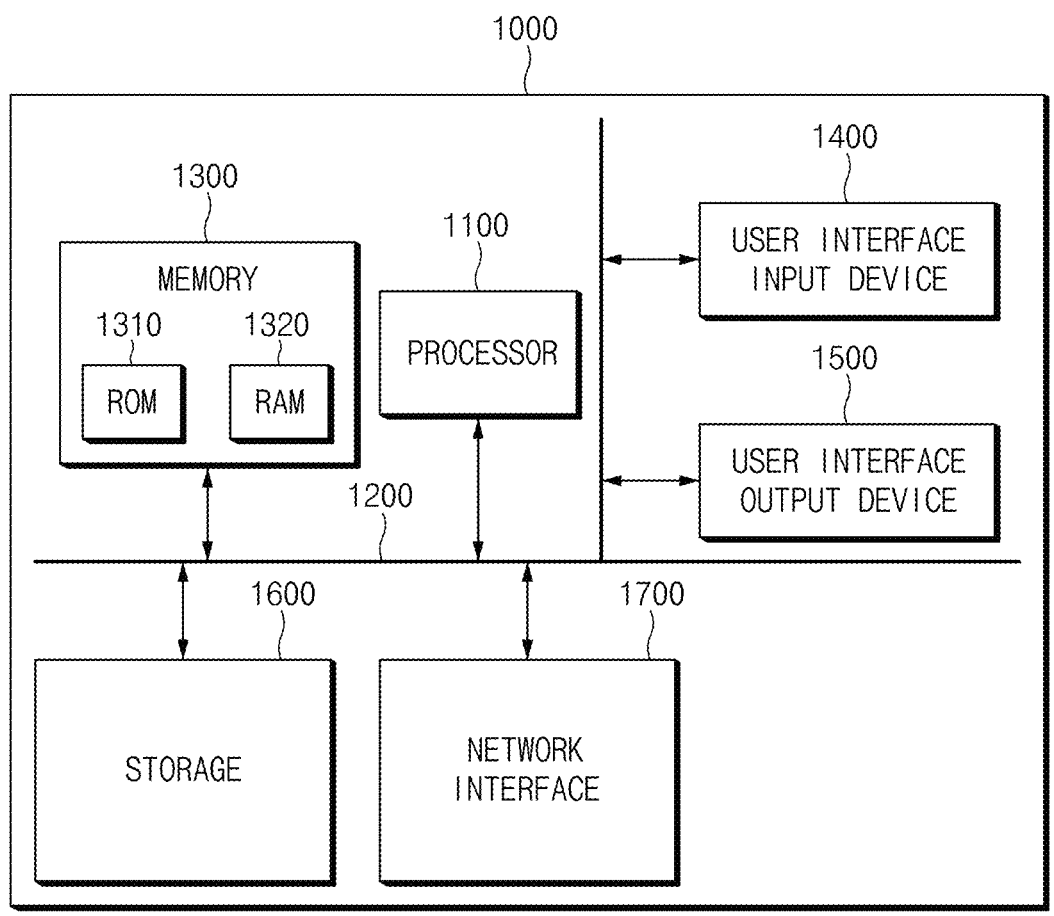
FIG. 8 illustrates a computing system according to an embodiment of the present disclosure.

According to various embodiments, the components of the service robot 100 are not limited to those shown in FIG. 1, which may further include an additional component (e.g., at least one of components of FIG. 8). For example, the service robot 100 may further include a display (or a touch screen) for visually displaying information and/or a speaker for audibly outputting information. According to an embodiment, the service robot 100 may further include a communication circuit (not shown). The service robot 100 may transmit and receive data with an external device (e.g., an external server, an external service robot 100, and/or an external vehicle) through the communication circuit. The service robot 100 may include a product storage space, a tray, and/or a plate capable of loading a product during movement other than the robotic arm 131.

Figure 2:
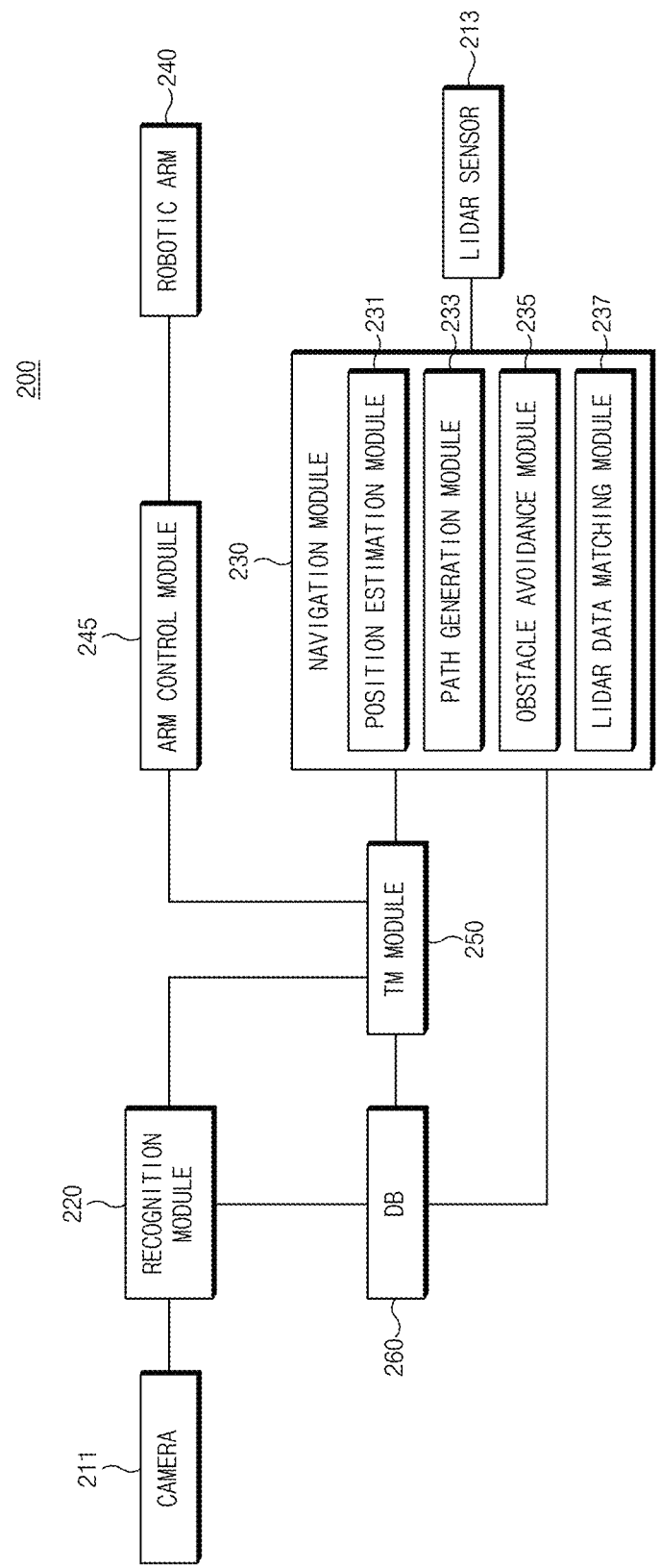
FIG. 2 is a block diagram illustrating a configuration of a service robot according to an embodiment of the present disclosure.

FIG. 2 is a block diagram illustrating a configuration of a service robot according to an embodiment of the present disclosure.

According to an embodiment, a service robot 200 may include a camera 211, a LiDAR sensor 213, a recognition module 220, a navigation module 230, a robotic arm 240, an arm control module 245, a task manager (TM) module 250, and a database (DB) 260.

According to an embodiment, the camera 211 may capture the outside of the service robot 200 to obtain image information (e.g., an image). For example, the camera 211 may obtain an image by capturing an object (e.g., a vehicle) in front of the service robot 200. The camera 211 may provide the recognition module 220 with the obtained image information.

According to an embodiment, the LiDAR sensor 213 may sense an external object of the service robot 200. For example, the LiDAR sensor 213 may obtain information about a position, a distance, and/or a shape of the external object. The LiDAR sensor 213 may provide the navigation module 230 with the obtained information about the external object.

According to an embodiment, the recognition module 220 may recognize an external object (e.g., an external vehicle) based on the image obtained by means of the camera 211. According to an embodiment, the recognition module 220 may recognize identification information of at least one vehicle included in the image. For example, the recognition module 220 may recognize a target vehicle to deliver a product based on the recognized identification information. For example, when the image includes a license plate of the target vehicle, the recognition module 220 may recognize a target vehicle based on a vehicle number included in the image.

According to an embodiment, the recognition module 220 may compare the image of the target vehicle with a reference vehicle image stored in the DB 260. For example, the recognition module 220 may compare the image of the target vehicle with an red green blue (RGB) data value and/or a pattern (e.g., a contour) of the reference vehicle image. For example, the recognition module 220 may determine a matching rate between the image of the target vehicle and the reference vehicle image (e.g., a plurality of images captured at various angles and distances for each vehicle type) and may identify a type of the target vehicle corresponding to the image and/or a heading angle of the target vehicle based on the matching rate. According to an embodiment, when comparing the image of the target vehicle with the reference vehicle image, the recognition module 220 may use a pre-trained machine learning model. According to an embodiment, the recognition module 220 may provide the TM module 250 and/or the navigation module 230 with the recognized information.

According to an embodiment, the navigation module 230 may include a position estimation module 231, a path generation module 233, an obstacle avoidance module 235, and a LiDAR data matching module 237.

According to an embodiment, the position estimation module 231 may estimate a position of the service robot 200. For example, the position estimation module 231 may analyze sensor data obtained by means of the camera 211 and the LiDAR sensor 213 and may estimate a current position of the service robot 200. For example, the position estimation module 231 may determine whether the service robot 200 is present at any position in a specific space where the service robot 200 provides a service. According to an embodiment, the position estimation module 231 may recognize a position of the service robot 200 based on transmission and reception of a data signal including a global positioning system (GPS) signal.

According to an embodiment, the path generation module 233 may generate or correct a movement path to a target position to provide a service. The path generation module 233 may determine a target position to deliver a delivery product to the target vehicle based on information about a distance from the target vehicle, which is received from the navigation module 230, information about a relative direction of the target vehicle, information about a relative direction of the target vehicle, which is received from the recognition module 220, information about a type of the target vehicle, which is received from the recognition module 220, and/or the reference vehicle information stored in the DB 260. The path generation module 233 may determine a shortest path where the service robot 200 reaches the determined target position as a movement path. According to an embodiment, when it is impossible for the service robot 200 to drive due to an obstacle on the previously generated path, the path generation module 233 may generate (or correct) a new driving path. The path generation module 233 may generate a path for avoiding the obstacle based on obstacle-related information received from the obstacle avoidance module 235.

According to an embodiment, the obstacle avoidance module 235 may detect an obstacle based on the sensor data obtained using the LiDAR sensor 213 and may determine an avoidance policy for avoiding the obstacle. The obstacle avoidance module 235 may deliver information about the detected obstacle to the path generation module 233. For example, the obstacle avoidance module 235 may determine whether the external object detected based on the reference vehicle data is a part of the target vehicle (e.g., a door of the target vehicle) or another object. When the external object is the other object rather than the part of the target vehicle, the obstacle avoidance module 235 may determine a policy for avoiding the object. For example, when the obstacle is detected, the obstacle avoidance module 235 may: determine to clear the obstacle using the robotic arm 240; generate a new path by means of the path generation module 233; notify the outside of the presence of the obstacle by means of an output device (e.g., a speaker or a display); and/or notify an external device (e.g., a manager device or a control server) of the presence of the obstacle.

According to an embodiment, the LiDAR data matching module 237 may compare the LiDAR data obtained from the LiDAR sensor 213 with the reference vehicle information. According to an embodiment, when comparing the LiDAR data obtained using the LiDAR sensor 213 with the reference vehicle information, the LiDAR data matching module 237 may use a pre-trained machine learning model. For example, the reference vehicle information may include: reference LiDAR data for each type of the vehicle; information associated with doors of the vehicle; or information associated with a trunk of the vehicle. For example, the reference LiDAR data may include three-dimensional (3D) LiDAR data for the entire vehicle. For example, the information associated with the doors of the vehicle may include a position, a size, an opening and closing range, and/or 3D LiDAR data of each of the doors included in the vehicle. The information associated with the trunk of the vehicle may include a position, a size, an opening and closing range, and/or 3D LiDAR data of each of the doors included in the vehicle. For example, the LiDAR data matching module 237 may determine a matching rate between LiDAR data for the target vehicle and reference vehicle data and may recognize a relative direction of the target vehicle (e.g., a heading direction of the target vehicle) based on the matching rate. For example, the LiDAR data matching module 237 may recognize an angle the front of the target vehicle faces for the service robot 200 based on the matching rate. According to an embodiment, the LIDAR data matching module 237 may provide the path generation module 233, the obstacle avoidance module 235, and/or the TM module 250 with information about the recognized relative direction of the target vehicle.

According to an embodiment, the robotic arm 240 may be implemented to hold, grip, and/or adsorb (e.g., perform vacuum adsorption of) an object (e.g., a delivery product). The robotic arm 240 may be composed of a multi-axis robotic arm 240 to enhance the degree of freedom for delivering an object.

According to an embodiment, the arm control module 245 may control a holding, gripping, and/or adsorbing operation of the robotic arm 240 and may control movement and rotation of a multi-axis structure of the robotic arm 240. For example, the arm control module 245 may control motion of the robotic arm 240, under control of the TM module 250. For example, when the service robot 200 moves to a target position adjacent to the target vehicle, the arm control module 245 may control to deliver a delivery product to a space (e.g., the inside of a front left door, the inside of a front right door, the inside of a rear left door, the inside of a rear right door, or a trunk) of the target vehicle, which is specified by a user.

According to an embodiment, the TM module 250 may control a full service sequence of the service robot 200. For example, the TM module 250 may control such that at least one scenario (or operation) for allowing the service robot 200 to provide a specified service is sequentially performed. For example, the TM module 250 may be a main processor of the service robot 200, which may control the overall operation of the service robot 200. For example, the TM module 250 may control operations of the camera 211, the LiDAR sensor 213, the recognition module 220, and the navigation module 230 and may manage the DB 260.

According to an embodiment, the DB 260 may store a reference vehicle image and reference vehicle information. For example, the reference vehicle image may include a plurality of images obtained by capturing a vehicle at various angles and/or various distances for each type of the vehicle. For example, the reference vehicle information may include at least one of reference LiDAR data (e.g., 410 of FIG. 4) for each type of the vehicle, information associated with doors of the vehicle, or information associated with a trunk of the vehicle. For example, the reference vehicle information may include information of a specified format (e.g., a pure component data (PCD) extension file).

According to an embodiment, the camera 211 and the LiDAR sensor 213 may be included in at least one sensor 110 of FIG. 1. According to an embodiment, the recognition module 220, the TM module 250, the arm control module 245, and the navigation module 230 are illustrated and described as separate components, but at least some of the recognition module 220, the TM module 250, the arm control module 245, and the navigation module 230 may be implemented as one component. For example, the recognition module 220, the TM module 250, the arm control module 245, and the navigation module 230 may be included in a processor 140 of FIG. 1. According to an embodiment, the DB 260 may be included in storage 120 of FIG. 1. According to various embodiments, the components of the service robot 200 are not limited to those shown in FIG. 2. Some of the components of the service robot 200 may be omitted or at least one component (e.g., at least one of components of FIG. 8) may be added to the components of the service robot 200.

Figure 3:
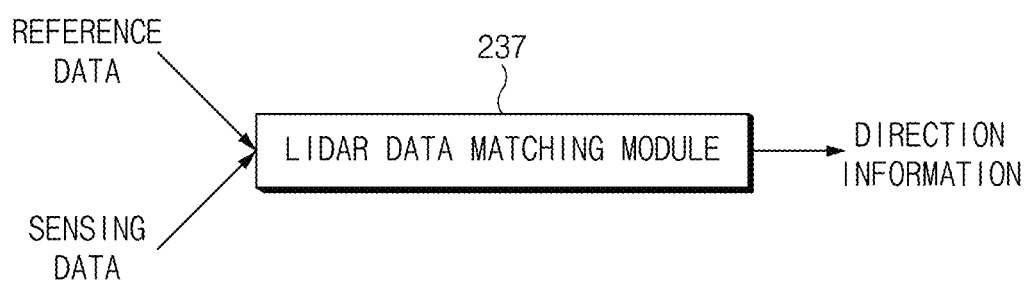
FIG. 3 is a drawing for describing an operation of obtaining direction information in a service robot according to an embodiment of the present disclosure.

FIG. 3 is a drawing for describing an operation of obtaining direction information in a service robot according to an embodiment of the present disclosure.

According to an embodiment, a LiDAR data matching module 237 may receive reference data and sensing data as inputs and may output direction information of a target vehicle. For example, the reference data may include reference vehicle information stored in storage (or a DB) of the service robot. The reference vehicle information may include at least one of reference LiDAR data for each type of the vehicle, information associated with doors of the vehicle, or information associated with a trunk of the vehicle. For example, the service robot may store the reference data in the form of a specified format (e.g., a PCD extension file). For example, the sensing data may include LiDAR data obtained using a LiDAR sensor. For example, the direction information may include information about a relative direction of the target vehicle for the service robot. The direction information may include information about a distance between the service robot and the target vehicle.

According to an embodiment, the LiDAR data matching module 237 may determine a matching rate between the LiDAR data sensed using the LiDAR sensor and the reference LiDAR data. For example, when the matching rate between the sensed LiDAR data and the reference LiDAR data is greater than or equal to a specified reference value, the LiDAR data matching module 237 may determine a relative direction (e.g., a heading angle) of the target vehicle based on the reference LiDAR data.

Figure 4:
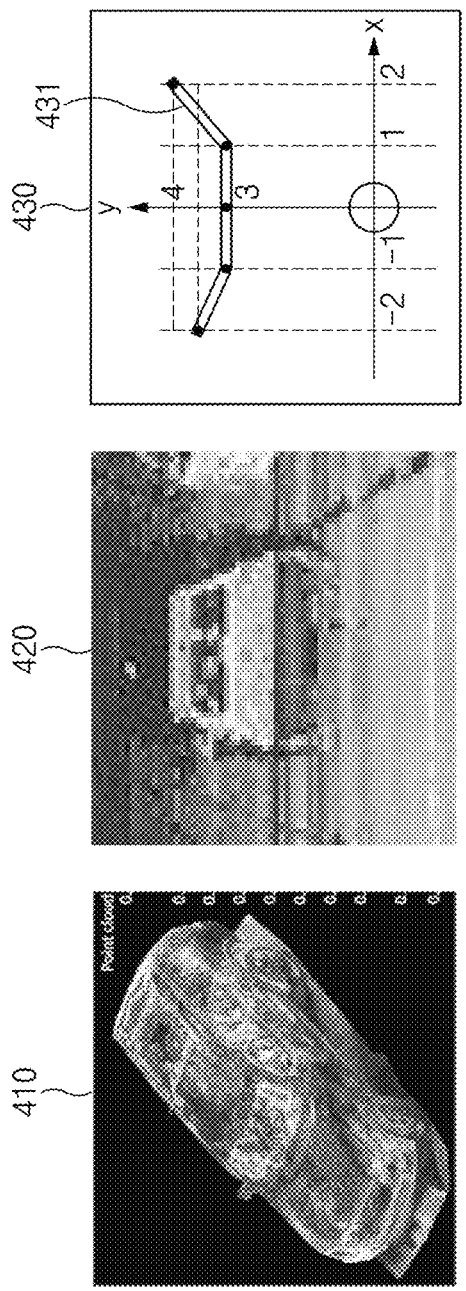
FIG. 4 is a drawing for describing an operation of a service robot according to an embodiment of the present disclosure.

FIG. 4 is a drawing describing an operation of a service robot according to an embodiment of the present disclosure.

For example, reference numeral 410 indicates an example of reference LiDAR data stored by the service robot. For example, the service robot may include 3D LiDAR reference data of a vehicle for each of the vehicle. For example, the 3D LiDAR reference data may include LiDAR data for all orientations of the vehicle.

For example, reference numeral 420 indicates an example of LiDAR data associated with a target vehicle, which is obtained using a LiDAR sensor by the service robot. For example, the service robot may obtain 3D LiDAR data for the target vehicle using the LiDAR sensor. For example, reference numeral 430 is obtained by schematizing the surface of the target vehicle, which is detected with LiDAR data, from a top view. For example, assuming that the origin (0, 0) of coordinates is the service robot, the surface (or outer portion) 431 of the target vehicle may be detected as [(−2, 3.5, 0), (−1, 3, 0), (0,3,0), (1, 3, 0), (2, 4, 0)]. A description is given assuming that a z-axis coordinate is "0" for convenience of description, but real LiDAR data may be 3D data, which may be measured as 3D coordinates for the surface of the target vehicle.

According to an embodiment, the service robot may determine a matching rate between the obtained LiDAR data and reference LiDAR data. For example, the service robot may fine a portion matched with coordinate information determined in reference numeral 430 from the reference LiDAR data. For example, when finding the portion matched with the measured LiDAR data from the reference LiDAR data, the service robot may determine a relative direction of the target vehicle (e.g., a heading angle of the target vehicle) based on information of the matched portion of the reference LiDAR data.

Figure 5A:
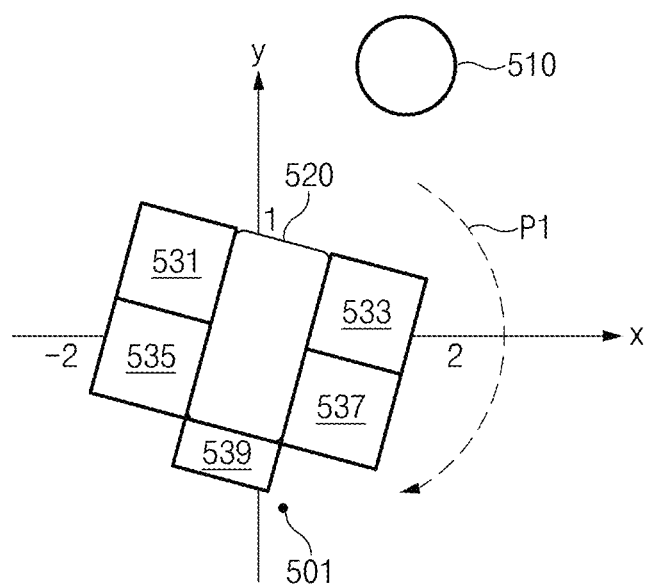
FIGS. 5A and 5B are drawings for describing an operation of a service robot according to an embodiment of the present disclosure.
Figure 5B:
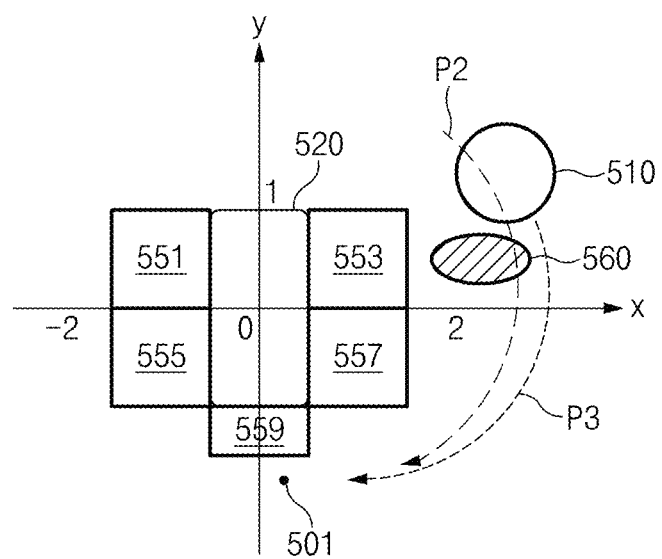

FIGS. 5A and 5B are drawings for describing an operation of a service robot according to an embodiment of the present disclosure.

According to an embodiment, a service robot 510 may recognize a type of a target vehicle 520 or 540 using an image obtained by means of a camera. The service robot 510 may compare LiDAR reference data for each vehicle type, which is stored in a DB, with LiDAR data for the target vehicle 520 or 540, which is sensed using a LiDAR sensor. The service robot 510 may recognize a relative direction of the target vehicle 520 or 540 for the service robot 510 depending on the compared result. The service robot 510 may recognize a door range and a trunk range of the target vehicle 520 or 540 based on the relative direction of the target vehicle 520 or 540 and the reference vehicle data stored in the DB. For example, the service robot 510 may recognize a front left door range, a front right door range, a rear left door range, a rear right door range, and a trunk range of the target vehicle 520 or 540.

For example, referring to FIG. 5A, an operation of delivering a delivery product to the first target vehicle 520 in the service robot 510 is illustrated. According to an embodiment, the service robot 510 may receive a user input for specifying a space of the first target vehicle 520 to deliver the delivery product. For example, a user may specify the space of the first target vehicle 520 to deliver the delivery product to one space among: the inside of the front left door of the first target vehicle 520; the inside of the front right door of the first target vehicle 520; the inside of the rear left door of the first target vehicle 520; the inside of the rear right door of the first target vehicle 520; or the inside of the trunk of the first target vehicle 520. When the user specifies the space of the first target vehicle 520 to deliver the delivery product to the trunk of the first target vehicle 520, the service robot 510 may determine: a first target position 501 corresponding to the trunk of the first target vehicle 520; and a path P1 for moving to the first target position 501 based on the relative direction of the first target vehicle 520. According to an embodiment, the service robot 510 may determine the target position 501 with regard to a door range (e.g., a front left door range 531, a front right door range 533, a rear left door range 535, a rear right door range 537, and/or a trunk range 559) of the first target vehicle 520. According to an embodiment, the service robot 510 may determine a position, at which a moving radius of a robotic arm does not meet with the first target vehicle 520 (e.g., a body of the first target vehicle 520 or a door range (e.g., the front left door range 531, the front right door range 533, the rear left door range 535, the rear right door range 537, or the trunk range 559) of the first target vehicle 520) and the robotic arm is able to move to be shortest when delivering the delivery product, as the first target position 501. According to an embodiment, the service robot 510 may move to the first target position 501 along the determined path P1 and may deliver the delivery product to a specified space (e.g., the trunk) of the target vehicle 520.

For example, referring to FIG. 5B, an operation of delivering a delivery product to the second target vehicle 540 in the service robot 510 is illustrated. For example, FIG. 5b illustrates that the service robot 510 detects another object except for the second target vehicle 540 (e.g., a body of the second target vehicle 540) using a sensor (e.g., a LiDAR sensor). For example, when the user specifies the space of the second target vehicle 540 to deliver the delivery product to the trunk of the second target vehicle 540, the service robot 510 may determine: a second target position 505 corresponding to the trunk of the second target vehicle 540; and a path P2 for moving to the second target position 505 based on the relative direction of the second target vehicle 540. For example, when detecting the object except for the second target vehicle 540, the service robot 510 may determine whether the detected object is within a door range of the second target vehicle 540 (e.g., a front left door range 551, a front right door range 553, a rear left door range 555, a rear right door range 557, and/or a trunk range 559 of the second target vehicle 540). For example, when the object is detected within the door range 551, 553, 555, or 557 or the trunk range 559 of the second target vehicle 540, the service robot 510 may determine that the detected object is the door or the trunk of the second target vehicle 540. In other words, the service robot 510 may determine that the door of the second target vehicle 540 is opened or the trunk of the second target vehicle 540 is opened. For example, when it is determined that the detected object is a part (e.g., the door or the trunk) of the second target vehicle 540, the service robot 510 may maintain the existing path P2, may move again after waiting for a specified time, or may output a notification that the detected object interferes with the path. When the object out of the door range 551, 553, 555, or 557 or the trunk range 559 of the second target vehicle 540, the service robot 510 may recognize the detected object as an obstacle 560 and may determine a path P3 for avoiding the obstacle 560. For example, the service robot 510 may change the existing path P2 for moving to the second target position 505 to the new path P3. For example, when moving the obstacle 560 using the robotic arm, the service robot 510 may clear the obstacle 560 using the robotic arm and may move to the second target position 505 along the existing path P2.

Figure 6:
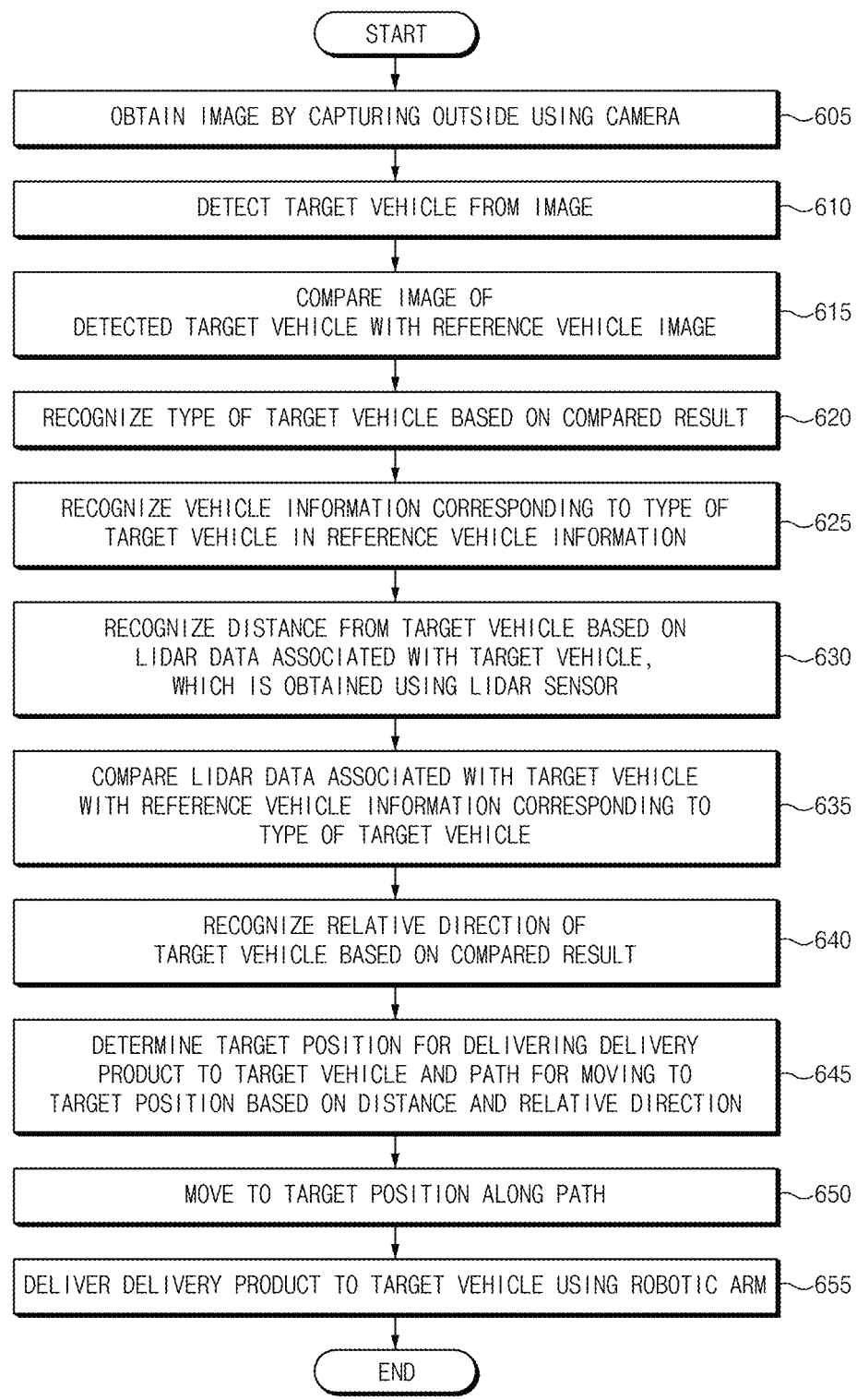
FIG. 6 is a flowchart for describing a method for providing a delivery service in a service robot according to an embodiment of the present disclosure.
Figure 7:
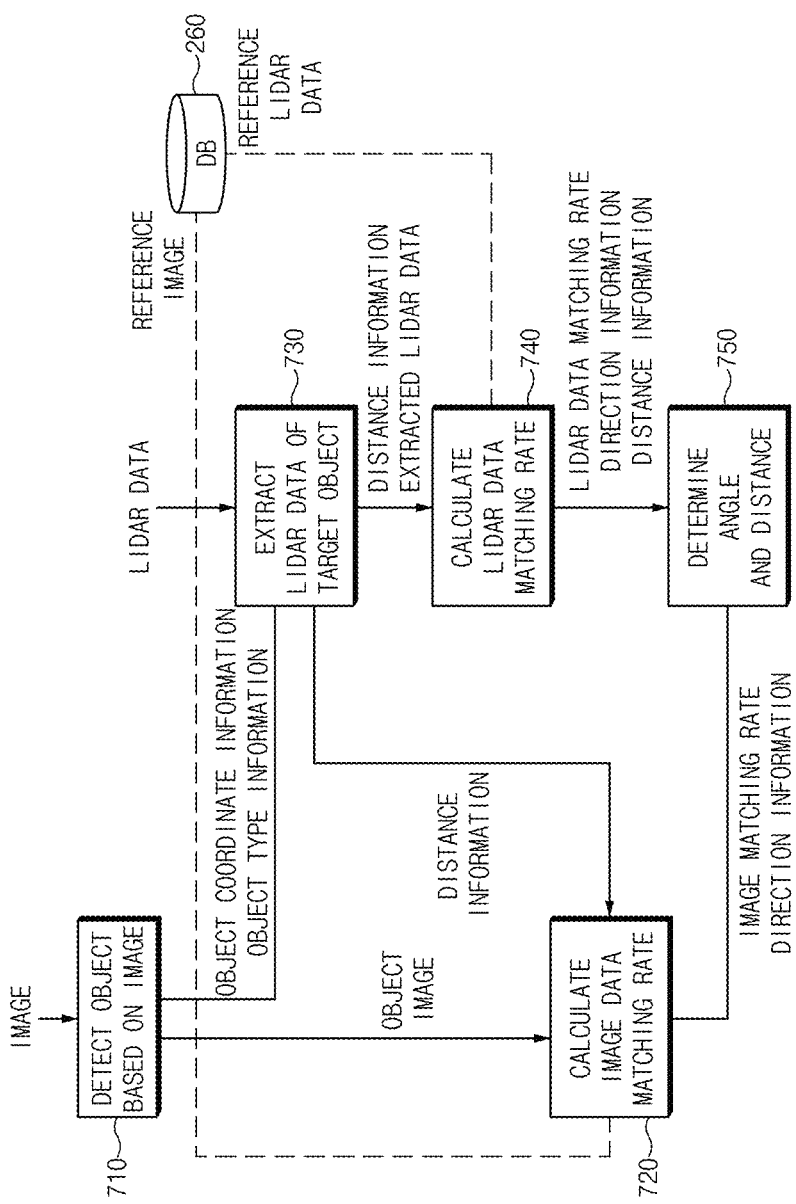
FIG. 7 is a flow diagram for describing a method for providing a delivery service in a service robot according to an embodiment of the present disclosure.

Hereinafter, a description is given in detail of a method for providing a delivery service according to another embodiment of the present disclosure with reference to FIGS. 6 and 7. FIGS. 6 and 7 are flowcharts for describing a method for providing a delivery service in a service robot 510 according to another embodiment of the present disclosure.

Hereinafter, it is assumed that a service robot 100 of FIG. 1 (or a service robot 200 of FIG. 2) performs a process of FIGS. 6 and 7. Furthermore, in a description of FIGS. 6 and 7, an operation described as being performed by a service robot may be understood as being controlled by a processor 140 of the service robot 100 of FIG. 1 (or a recognition module 220, a navigation module 230, an arm control module 245, and/or a TM module 250 of the service robot 200 of FIG. 2).

FIG. 6 is a flowchart for describing a method for providing a delivery service in a service robot according to an embodiment of the present disclosure.

According to an embodiment, in operation 605, the service robot may obtain an image by capturing the outside of the service robot using its camera. The image may include at least one object (e.g., a vehicle).

According to an embodiment, in operation 610, the service robot may detect a target vehicle from the image. For example, the service robot may recognize identification information (e.g., a license plate) of at least one vehicle included in the image. The service robot may detect a target vehicle to provide a service (e.g., product delivery) based on the recognized identification information. According to an embodiment, the service robot may obtain coordinate information (e.g., boundary box (Bbox) information) indicating a boundary of the target vehicle from the image. According to an embodiment, the service robot may extract an image of the target vehicle from the image.

According to an embodiment, in operation 615, the service robot may compare the image of the detected target vehicle with a reference vehicle image. For example, storage (or a DB) of the service robot may include at least one reference vehicle image for each of a plurality of vehicle types. For example, the reference vehicle image may include a plurality of images including at least a part of the vehicle for each type of the vehicle. For example, the service robot may determine a matching rate between the image of the target vehicle and a plurality of reference vehicle images. According to an embodiment, the reference vehicle image may include images for each angle for all orientations of the vehicle for each type of the vehicle. According to an embodiment, the service robot may determine a matching rate (hereinafter referred to as an "image matching rate") between the image of the target vehicle for each angle and the reference vehicle image. According to an embodiment, the service robot may recognize an angle with the highest image matching rate as a relative direction (hereinafter referred to as a "first measurement direction") of the target vehicle for the service robot. According to an embodiment, the operation of recognizing the first measurement direction based on the image matching rate in the service robot may be omitted. In this case, the service robot may recognize only a type of the target vehicle based on the image.

According to an embodiment, in operation 620, the service robot may recognize the type of the target vehicle based on the compared result. The service robot may recognize the type of the target vehicle based on a reference vehicle image corresponding to the image of the target vehicle. For example, because the reference vehicle image includes an image for each of a plurality of vehicle types, the service robot may recognize a vehicle type of a reference vehicle image with the highest matching rate with the image of the target vehicle as the type of the target vehicle.

According to an embodiment, in operation 625, the service robot may recognize vehicle information corresponding to the type of the target vehicle in the reference vehicle information. For example, the storage (or the DB) of the service robot may store reference vehicle information including vehicle information for each type of the vehicle. For example, the reference vehicle information may include reference LiDAR data for each type of the vehicle, information associated with doors of the vehicle, or information associated with a trunk of the vehicle. For example, the reference LiDAR data may include 3D LiDAR data for the entire vehicle. The information associated with the doors of the vehicle may include information about a length, a width, and a depth of each of the doors of the vehicle and 3D LiDAR data for each of the doors of the vehicle. The information associated with the trunk of the vehicle may include information about a length, a width, and a depth of the trunk of the vehicle and 3D LiDAR data for the trunk of the vehicle. For example, the service robot may recognize reference LiDAR data corresponding to the recognized type of the target vehicle, data associated with the doors, and/or data associated with the trunk.

According to an embodiment, in operation 630, the service robot may recognize a distance from the target vehicle based on LiDAR data associated with the target vehicle, which is obtained using the LiDAR sensor. For example, the service robot may recognize a distance from an external object (e.g., the target vehicle) based on data sensed using the LiDAR sensor. According to an embodiment, the service robot may extract LiDAR data associated with the target vehicle from the LiDAR data for the external object, which is obtained using the LiDAR sensor, based on coordinate information indicating a boundary of the target vehicle obtained from the image in operation 610.

According to an embodiment, in operation 635, the service robot may compare the LiDAR data with reference vehicle information corresponding to the type of the target vehicle. For example, the service robot may determine a matching rate (hereinafter referred to as a "LiDAR data matching rate") for each angle between the LiDAR data associated with the target vehicle and the reference vehicle data.

According to an embodiment, in operation 640, the service robot may recognize a relative direction of the target vehicle based on the compared result in operation 635. For example, the service robot may recognize an angle with the highest LiDAR data matching rate as a relative direction (hereinafter referred to as a "second measurement direction") of the target vehicle for the service robot.

According to an embodiment, in operation 645, the service robot may determine a target position for delivering a delivery product to the target vehicle and a path for moving to the target position, based on the distance from the target vehicle and the relative direction of the target vehicle. According to an embodiment, the service robot may receive a user input for specifying a space of the target vehicle to deliver the delivery product. For example, the user may specify the space of the target vehicle to deliver the delivery product to one space among the inside of a front left door of the target vehicle, the inside of a front right door of the target vehicle, the inside of a rear left door of the target vehicle, the inside of a rear right door of the target vehicle, or the inside of a trunk of the target vehicle. According to an embodiment, the service robot may determine a target position with regard to the space of the target vehicle, which is specified by the user. For example, when the user specifies the space of the target vehicle to deliver the delivery product to the trunk of the target vehicle, the service robot may determine a target position corresponding to the trunk of the target vehicle and a path for moving to the target position, based on the relative direction of the target vehicle. According to an embodiment, the service robot may determine a position, at which a moving radius of the robotic arm does not meet with the target vehicle (e.g., a body of a first target vehicle or a door range or a trunk range of the first target vehicle) and the robotic arm is able to move to be shortest when delivering the delivery product to the space specified by the user, as the target position.

According to an embodiment, the service robot may detect an external object which is present on the path using the LiDAR sensor during movement. The service robot may determine whether the position where the external object is detected is within the door range or the trunk range of the target vehicle based on the reference vehicle information. For example, when the position where the external object is detected corresponds to an opening and closing range of the door or the trunk of the target vehicle, the service robot may recognize the external object as the door or the trunk of the target vehicle. For example, when the position where the external object is detected does not correspond to the opening and closing range of the door or the trunk of the target vehicle, the service robot may recognize the external object as an obstacle. For example, when an object is detected within the door range or the trunk range of the target vehicle, the service robot may determine that the detected object is a part of the target vehicle (e.g., the door or the trunk of the target vehicle). For example, the service robot may determine that the door of the target vehicle is opened or the trunk of the target vehicle is opened. When it is determined that the detected object is a part (e.g., the door or the trunk) of the target vehicle, the service robot may maintain an existing movement path, may move again after waiting for a specified time, or may output a notification that the detected object interferes with the path. For example, when an object out of the door range or the trunk range of the target vehicle is detected, the service robot may recognize the detected object as an obstacle regardless of the target vehicle. When the obstacle is recognized on the movement path, the service robot may determine a new path for avoiding the obstacle to reach the target position. For example, the service robot may correct the existing movement path to another path. For example, when moving the detected obstacle using the robotic arm, the service robot may clear the obstacle using the robotic arm and may maintain the existing movement path.

According to an embodiment, in operation 650, the service robot may move to the target position along the determined path.

According to an embodiment, in operation 655, the service robot may deliver the delivery product to the target vehicle using the robotic arm. For example, the service robot may deliver the delivery product to a space (e.g., the inside of a specific door or the inside of the trunk) of the target vehicle, which is specified by the user, using the robotic arm.

According to various embodiments, the method for providing the delivery service in the service robot is not limited to the operations and the order described with reference to FIG. 6. At least some of the operations described with reference to FIG. 6 may be omitted or a new operation may be added to the operations described with reference to FIG. 6. An order of the respective operations may be changed or at least some of the operations described with reference to FIG. 6 may be performed at the same time.

FIG. 7 is a flow diagram for describing a method for providing a delivery service in a service robot according to an embodiment of the present disclosure.

According to an embodiment, in operation 710, the service robot may detect an object based on an image obtained by means of its camera. For example, the service robot may detect a target vehicle from the image obtained by means of the camera. For example, the service robot may detect identification number (e.g., a license plate) of at least one vehicle included in the image and may detect the target vehicle based on the identification number. For example, the service robot may recognize coordinate information (e.g., boundary box (Bbox) information) indicating a boundary of the target vehicle in the recognized image. According to an embodiment, the service robot may extract an image of the target vehicle from the image obtained using the camera. According to an embodiment, the service robot may recognize a type of the target vehicle included in the image by means of an image analysis. For example, the service robot may determine whether the target vehicle is a sedan, a recreational vehicle (RV), or a sports utility vehicle (SUV) or has a specific vehicle model based on the image analysis.

According to an embodiment, in operation 720, the service robot may determine a matching rate (hereinafter referred to as an "image matching rate") between the image of the target vehicle and at least one reference image stored in a DB 260. For example, the DB 260 may store a plurality of reference images for at least a part of the vehicle for each type of the vehicle. For example, the DB 260 may include reference images for each angle. For example, when the front center of the vehicle is viewed as a reference point of 0 degrees, the DB 260 may store images of the vehicle viewed in each of directions among 0 degrees to 360 degrees as reference images for each type of the vehicle. The service robot may recognize a reference image having a matching rate of a specified value or more with the image of the target vehicle and may recognize a relative angle of a current target vehicle for the service robot based on the recognized reference image. For example, when the obtained image of the target vehicle has a matching rate of a specified value or more with a reference image looking at a specific vehicle from a 30-degree angle in front, the service robot may determine that the relative angle of the target vehicle is 30 degrees. According to an embodiment, the service robot may determine an image matching rate based on a distance from the target vehicle, which is detected using its LiDAR sensor. For example, because the image of the target vehicle is able to vary in size or shape with the distance from the target vehicle, the service robot may correct the image of the target vehicle depending on the distance from the target vehicle and may compare the corrected image with the reference image. As another example, when the DB 260 includes reference images for each different vehicle type depending on the distance, the service robot may compare the reference images corresponding to the distance from the target vehicle with the image of the target vehicle and may determine a matching rate.

According to an embodiment, in operation 730, the service robot may extract LiDAR data of the target object from LiDAR data obtained using the LiDAR sensor. For example, the service robot may extract LiDAR data corresponding to the target vehicle among pieces of LiDAR data based on the type of the target vehicle, which is recognized in operation 710. For example, the service robot may extract the LiDAR data corresponding to the target vehicle among the pieces of LiDAR data, based on coordinate information (e.g., boundary box (Bbox) information) indicating a boundary of the target vehicle in the image recognized in operation 710.

According to an embodiment, the service robot may recognize the distance from the target vehicle, which is detected based on the LiDAR data.

According to an embodiment, in operation 740, the service robot may determine a matching rate (hereinafter referred to as a "LiDAR data matching rate") between the LiDAR data extracted based on the information about the distance from the target vehicle and reference LiDAR data. For example, the reference LiDAR data may include a 3D LiDAR data value for the entire vehicle for each vehicle type. The service robot may determine a matching rate for each angle between the extracted LiDAR data and the reference LiDAR data and may recognize an angle with the highest matching rate or a specified value or more as a relative angle of the target vehicle for the service robot.

According to an embodiment, in operation 750, the service robot may determine a direction of the target vehicle based on the image matching rate and the LiDAR data matching rate. For example, the service robot may add the image matching rate for each angle and the LiDAR data matching rate for each angle and may determine an angle with the highest matching rate as the direction of the target vehicle. For example, the service robot may determine an angle with the highest weighted average value as the direction of the target vehicle based on a weighted average value of the image matching rate for each angle and the LiDAR data matching rate for each angle.

According to an embodiment, the service robot may determine the direction of the target vehicle based on the relative direction (hereinafter referred to as a "first measurement direction") recognized using the image of the target vehicle in operation 720 and the relative direction (hereinafter referred to as a "second measurement direction") recognized using the LiDAR data associated with the target vehicle in operation 730. For example, the service robot may determine an average or a weighted average of angles indicating the first measurement direction and the second measurement direction as the direction of the target vehicle.

According to an embodiment, the service robot may determine a target position to provide a service based on the determined direction of the target vehicle and the distance from the target vehicle and may determine a path for moving to the target position. For example, the service robot may determine a target position corresponding to a space of the target vehicle (e.g., at least one of a front left door, a front right door, a rear left door, a rear right door, or a trunk of the target vehicle) to deliver the delivery product, which is specified by the user, depending on the relative direction of the target vehicle and the distance from the target vehicle. For example, the service robot may take a delivery product to a position corresponding to the space specified by the user in the target vehicle and may deliver the delivery product to the space specified by the user, rather than simply taking the delivery product near the target vehicle.

According to various embodiments, the method for providing the delivery service in the service robot is not limited to the operations and the order described with reference to FIG. 7. At least some of the operations described with reference to FIG. 7 may be omitted or a new operation may be added to the operations described with reference to FIG. 7. An order of the respective operations may be changed or at least some of the operations described with reference to FIG. 7 may be performed at the same time. For example, it is described that the service robot determines the relative direction of the target vehicle with regard to both the image matching rate and the LiDAR data matching rate in FIG. 7. However, according to various embodiments, the service robot may determine a relative direction of the target vehicle based on the image matching rate or the LiDAR data matching rate. For example, the service robot may recognize a type of the target vehicle based on an image analysis and may determine a relative direction of the target vehicle based on the result of comparing LiDAR data sensed based on the type of the target vehicle with reference LiDAR data.

FIG. 8 illustrates a computing system according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disc, a removable disk, and a compact-disk ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The service robot and the method for delivering the delivery service thereof according to embodiments disclosed in the present disclosure may deliver a delivery product to a vehicle space desired by the user.

The service robot and the method for delivering the delivery service thereof according to embodiments disclosed in the present disclosure may recognize a target vehicle to provide a delivery service, a relative direction of the target vehicle, and a door and trunk range of the target vehicle and may determine a target position to deliver the delivery product and a movement path.

The service robot and the method for delivering the delivery service thereof according to embodiments disclosed in the present disclosure may recognize a structure of the target vehicle and may deliver the delivery product to a space (e.g., one of the inside of a specific door of the target vehicle or the inside of a truck of the target vehicle) specified by the user.

In addition, various effects ascertained directly or indirectly through the present disclosure may be provided.

Hereinabove, although the present disclosure has been described with reference to embodiments and the accompanying drawings, the present disclosure is not limited thereto, but may be variously modified and altered by those with ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

What is claimed is:

1. A service robot, comprising:
a camera configured to capture images of surroundings of the service robot;
a light detection and ranging (LiDAR) sensor;
a driving device including a robotic arm;
a processor; and
a storage including a reference vehicle image and reference vehicle information,
wherein the processor is configured to:
detect a target vehicle from the images received from the camera;
compare an image of the detected target vehicle with the reference vehicle image;
recognize a type of the target vehicle based on the compared result;
recognize vehicle information corresponding to the type of the target vehicle in the reference vehicle information;
recognize a distance from the target vehicle based on LiDAR data associated with the target vehicle, the LiDAR data being obtained using the LiDAR sensor;
compare the LiDAR data with the vehicle information corresponding to the type of the target vehicle;
recognize at least one relative direction of the target vehicle based on a comparison result between the LiDAR data and the vehicle information;
determine a target position for delivering a delivery product to the target vehicle and a path for moving to the target position based on the distance and the at least one relative direction;
control the service robot to move to the target position along the path; and
control the service robot to deliver the delivery product to the target vehicle using the robotic arm.

2. The service robot of claim 1, wherein the reference vehicle information includes at least one of:
reference LiDAR data for each type of a vehicle;
information associated with doors of the vehicle; or
information associated with a trunk of the vehicle.

3. The service robot of claim 2, wherein the processor is configured to:
determine a degree to which the LiDAR data and the reference LiDAR data are matched with each other; and
recognize at least one of the at least one relative direction based on the matched degree.

4. The service robot of claim 2, wherein the processor is configured to:
detect an external object presenting on the path using the LiDAR sensor;
recognize the external object as a door or a trunk of the target vehicle, when a position where the external object is detected corresponds to an opening and closing range of the door or the trunk of the target vehicle;
recognize the external object as an obstacle, when the position where the external object is detected does not correspond to the opening and closing range of the door or the trunk of the target vehicle; and determine a new path for avoiding the obstacle to reach the target position, when the obstacle is recognized.

5. The service robot of claim 1, wherein the processor is configured to:
receive a user input for specifying a vehicle space to deliver the delivery product among at least one door or a trunk provided in the target vehicle;
recognize a position corresponding to the specified vehicle space based on the user input based on the reference vehicle information; and
determine the target position based on the recognized position.

6. The service robot of claim 1, wherein the processor is configured to:
extract the image of the detected target vehicle from the images;
determine a degree to which the extracted image of the target vehicle and the reference vehicle image are matched with each other, based on the recognized distance;
recognize the at least one relative direction of the target vehicle based on the matched degree; and
determine a direction of the target vehicle based on a relative direction recognized using the image of the target vehicle and a relative direction recognized using the LiDAR data associated with the target vehicle.

7. The service robot of claim 1, wherein the processor is configured to:
obtain coordinate information indicating a boundary of the target vehicle from the image; and
extract the LiDAR data associated with the target vehicle from the LiDAR data for an external object, wherein the LiDAR data for the external object is obtained using the LiDAR sensor, based on the coordinate information.

8. The service robot of claim 1, wherein the processor is configured to determine the target position, based on an operation radius of the robotic arm and a degree of motion of the robotic arm, the degree being predicted when delivering the delivery product.

9. The service robot of claim 1, wherein the processor is configured to recognize identification information of at least one vehicle included in the images and detects the target vehicle among the at least one vehicle based on the identification information.

10. The service robot of claim 1, further comprising:
a communication device,
wherein the processor is configured to receive information associated with the reference vehicle image or the reference vehicle information from an external device through the communication device and configured to update the reference vehicle image or the reference vehicle information, based on the received information.

11. A method for providing a delivery service using a service robot, the method comprising:
obtaining, by a camera of the service robot, images by capturing surroundings of the service robot;
detecting, by a processor, a target vehicle from the images;
comparing, by the processor, an image of the detected target vehicle with a reference vehicle image included in reference vehicle information;
recognizing, by the processor, a type of the target vehicle based on the compared result;
recognizing, by the processor, from the reference vehicle information, vehicle information corresponding to the type of the target vehicle;
recognizing, by the processor, a distance from the target vehicle based on light detection and ranging (LiDAR) data associated with the target vehicle, the LiDAR data being obtained using a LiDAR sensor included in the service robot;
comparing, by the processor, the LiDAR data with the vehicle information corresponding to the type of the target vehicle;
recognizing, by the processor, at least one relative direction of the target vehicle based on a comparison result between the LiDAR data and the vehicle information;
determining, by the processor, a target position for delivering a delivery product to the target vehicle and a path for moving to the target position based on the distance and the at least one relative direction;
moving the service robot to the target position along the path; and
delivering the delivery product to the target vehicle using a robotic arm of the service robot.

12. The method of claim 11, wherein the reference vehicle information includes at least one of:
reference LiDAR data for each type of a vehicle;
information associated with doors of the vehicle; or
information associated with a trunk of the vehicle.

13. The method of claim 12, wherein recognizing the at least one relative direction includes:
determining a degree to which the LiDAR data and the reference LiDAR data are matched with each other; and
recognizing the at least one relative direction based on the matched degree.

14. The method of claim 11, wherein determining the target position includes:
receiving a user input for specifying a vehicle space to deliver the delivery product among at least one door or a trunk provided in the target vehicle;
recognizing a position corresponding to the specified vehicle space based on the user input based on the reference vehicle information; and
determining the target position based on the recognized position.

15. The method of claim 11, further comprising:
extracting the image of the detected target vehicle from the images;
determining a degree to which the extracted image of the target vehicle and the reference vehicle image are matched with each other, based on the recognized distance;
recognizing the at least one relative direction of the target vehicle based on the matched degree; and
determining a direction of the target vehicle based on a relative direction recognized using the image of the target vehicle and a relative direction recognized using the LiDAR data associated with the target vehicle.

16. The method of claim 11, wherein recognizing the distance from the target vehicle includes:
obtaining coordinate information indicating a boundary of the target vehicle from the image; and
extracting the LiDAR data associated with the target vehicle from LiDAR data for an external object, wherein the LiDAR data for the external object is obtained using the LiDAR sensor, based on the coordinate information.

17. The method of claim 11, further comprising:
detecting an external object presenting on the path using the LiDAR sensor;
recognizing the external object as a door or a trunk of the target vehicle, when a position where the external object is detected corresponds to an opening and closing range of the door or the trunk of the target vehicle;

recognizing the external object as an obstacle, when the position where the external object is detected does not correspond to the opening and closing range of the door or the trunk of the target vehicle; and determining a new path for avoiding the obstacle to reach the target position, when the obstacle is recognized.

18. The method of claim 11, wherein determining the target position includes determining the target position, based on an operation radius of the robotic arm and a degree of motion of the robotic arm, the degree being predicted when delivering the delivery product.

19. The method of claim 11, wherein detecting the target vehicle includes:

recognizing identification information of at least one vehicle included in the images; and detecting the target vehicle among the at least one vehicle based on the identification information.

20. The method of claim 11, further comprising:

receiving information associated with the reference vehicle image or the reference vehicle information from an external device; and updating the reference vehicle image or the reference vehicle information, based on the received information.

\* \* \* \* \*